Figure 1:
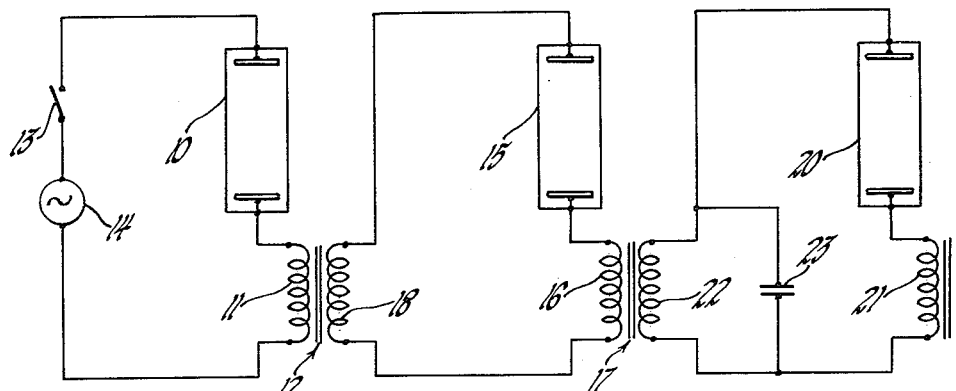

June 4, 1963  D. I. FALES  3,092,754

FLUORESCENT LAMP CIRCUIT

Filed Sept. 14, 1960

INVENTOR.
Douglas I. Fales
BY
Paul J. Ethington
ATTORNEY

United States Patent Office 3,092,754
Patented June 4, 1963

3,092,754
FLUORESCENT LAMP CIRCUIT
Douglas I. Fales, Flint, Mich., assignor to General Motors Corporation, Detroit, Mich., a corporation of Delaware
Filed Sept. 14, 1960, Ser. No. 55,956
6 Claims. (Cl. 315—97)

This invention relates to a gaseous discharge tube circuit and more particularly to a lighting system utilizing fluorescent lamps.

In any circuit including fluorescent tubes, it is necessary to have a starting and ballast arrangement. Conventional ballast devices comprise series inductors which, of course, result in an undesirable lagging power factor that must be compensated by shunt capacitors. This arrangement, however, is not suited for use in conjunction with the transistorized inverter circuits which have lately come into favor as highly efficient power supplies for vehicle electrical systems. That is, while a shunt capacitor corrects the power factor when a sine wave source is used, high frequency reactive current in the inductor and capacitor provide an undesirable loading effect on a power supply having a square wave output.

It is therefore the principal object of this invention to provide an improved starting and ballast arrangement for fluorescent lamps. Another object is to provide a fluorescent lamp circuit wherein reactive components are not necessary for ballast and power factor correction. A further object is to provide a fluorescent lamp circuit adapted for use with a square wave power supply. Still another object is to provide a unique cascade excitation circuit for gaseous discharge tubes.

In accordance with this invention, a discharge tube such as a fluorescent lamp is connected in series with the primary of a transformer. This series combination is connected across an A.C. power supply which may exhibit a square waveform. Upon starting of the lamp no current will flow through the transformer primary and so it will represent a low impedance. Thus the necessary high potential will appear across the lamp for starting. Across the secondary of the transformer may be connected a similar series combination of a fluorescent lamp and a transformer primary. This second circuit will operate exactly like the first circuit after the first tube has started. Several of these circuits can be connected in series, although the last circuit in the cascade arrangement must have a ballast inductor instead of the transformer primary and so must also include a shunt capacitor for power factor correction.

In one embodiment of this invention, the first series combination is excited by the output of a transistorized inverter or high frequency square wave generator. At the same time, heater electrodes for each of the fluorescent tubes are also excited from the inverter output.

Figure 2:
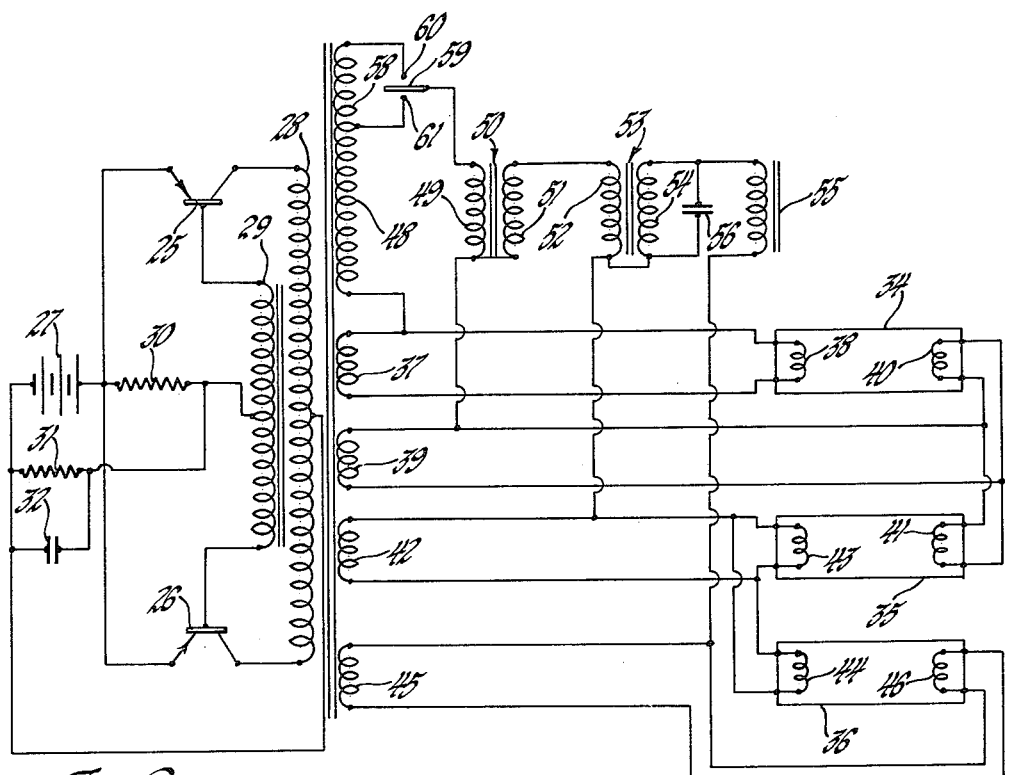

Further objects and advantages of this invention are set forth in the appended claims. The invention may best be understood by the following description of illustrative embodiments thereof read in conjunction with the accompanying drawing, in which:

FIGURE 1 is a schematic diagram of a lamp circuit incorporating the principal features of the invention; and FIGURE 2 is a schematic diagram of a modification of the lamp circuit of FIGURE 1.

With reference to FIGURE 1, there is shown a first fluorescent lamp 10 connected in series with a primary winding 11 of a transformer 12. This series combination is connected through an on-off switch 13 to an alternating current source 14 which may be a square wave generator. A second fluorescent lamp 15, being connected in series with a primary winding 16 of a transformer 17, is connected across a secondary winding 18 of the transformer 12. Other circuits similar to these two lamp circuits could be arranged subsequent to the transformer 17. The terminating circuit, however, must be of the type illustrated in connection with a fluorescent lamp 20. The lamp 20 is connected in series with a ballast inductor 21 and this series circuit is connected across a secondary winding 22 of the transformer 17. A shunt capacitor 23 is connected across this circuit for power factor correction.

In the operation of the circuit of FIGURE 1, a condition will be examined immediately after closing the switch 13. Initially, there will be little voltage drop across the primary 11 since the current through the lamp 10 will be negligible. Thus a high voltage will appear across the lamp 10, substantially equal to the supply voltage, so that the lamp 10 is started. As the current in the series circuit increases, the voltage drop across the primary 11 increases, thus limiting the current in the lamp 10. If the load across the secondary 18 is substantially resistive, then the impedance as seen by the primary 11 will also be resistive and so no power factor correction is necessary.

After the lamp 10 has started, a high voltage will appear across the secondary 18 and substantially all of this voltage will also appear across the lamp 15 since little current is flowing through the primary 16. Thus the lamp 15 will start and, as the current builds up, a large drop will appear across the primary 16 to limit the lamp current. This will also result in a voltage output on the transformer 17 which will initially appear undiminished across the lamp 20. When the lamp 20 is started, the inductor 21 will act as a ballast and limit current through the lamp. The shunt capacitor 23 introduces a leading current component to compensate for the lagging power factor caused by the ballast inductor 21. It is seen that no capacitors are needed in the first two circuits since no reactive components appear in the loaded condition. The transformers 12 and 17 appear as resistances. The capacitor 23 will have little effect on the power supply since the square waveform is smoothed out considerably upon reaching the end of the cascade arrangement.

With reference to FIGURE 2, a cascade fluorescent lamp circuit of the type shown in FIGURE 1 is illustrated in combination with a transistorized inverter circuit. This arrangement would have particular application to a vehicle lighting system. The inverter includes a pair of transistors 25 and 26 connected in a push-pull arrangement. The emitters of the transistors 25 and 26 are connected together and to one side of the vehicle battery 27, the opposite terminal of the battery being connected through a center tapped transformer primary 28 to the transistor collectors. The base circuits of the transistors are driven from a center tapped feedback winding 29. Base-emitter current is limited by a series resistor 30 and the correct operating point is selected by a biasing arrangement including a resistor 31 and a capacitor 32.

The inverter output is connected to drive a plurality of fluorescent lamps 34, 35, and 36. These lamps are of the quick starting heater type and low voltage secondary windings on the inverter transformer are directly connected to the heater filaments. That is, the winding 37 is connected across a heater electrode 38 on one end of the lamp 34 while a secondary winding 39 is connected across a heater electrode 40 of this lamp. The winding 39 is also connected across a heater 41 on one end of the lamp 35. Likewise, a secondary winding 42 excites heater electrodes 43 and 44 of the lamps 35 and 36, respectively. A further secondary winding 45 excites the remaining heater electrode 46 on the opposite end of the lamp 36. Thus it is seen that only four low voltage secondary windings are necessary to excite six heater electrodes.

The discharge paths of the lamps 34, 35, and 36 are excited from a high voltage secondary winding 48. The winding 48 is connected across a series circuit which includes a primary winding 49 on a transformer 50 and also the discharge path of the lamp 34. The secondary 51 of this transformer 50 is connected across a second series circuit including a primary 52 of a transformer 53 and also including the discharge path of the lamp 35. A secondary winding 54 of the transformer 53 is connected across a terminating circuit which includes a ballast inductor 55 and the discharge path of the lamp 36. A shunt capacitor 56 is connected across this final circuit. To provide a higher input voltage for starting, the winding 48 includes a tapped portion 58 which may be included or omitted from the input circuit by a thermal switch 59. The switch 59, in its cold condition, rests against a pole 60. After the thermal element of the switch has been heated by lamp current, it is adapted to switch over and rest against a pole 61, providing a lower voltage for subsequent running.

The operation of the circuit illustrated in FIGURE 2 corresponds to that of the circuit of FIGURE 1. The inverter circuit including the transistors 25 and 26 provides a high frequency square wave input of about 900 c.p.s. Upon starting, the output of the secondary winding 48 initially appears across the lamp 34, little impedance being presented by the primary 49. When the lamp 34 has started, current flows in the primary 49 and a voltage appears across the secondary 51 and likewise across the lamp 35. When the lamp 35 has started, the lamp current passing through the primary 52 will result in a voltage across the secondary 54 which is adequate to start the lamp 36. Current in this lamp is limited after starting by the ballast inductor 55.

While the invention has been described in terms of two illustrative embodiments it is not to be limited thereto. Various modifications may be made by persons skilled in the art and it is intended that the appended claims will cover any such modifications as fall within the true scope of the invention.

I claim:

1. In a gaseous discharge tube system, a first series circuit comprising a discharge tube and the primary of a transformer, an alternating voltage source connected across said first series circuit, substantially all of the voltage from said source being initially applied across said tube permitting said tube to start, an increased portion of the voltage from said source being applied across said primary and a decreased portion of the voltage from said source being applied across said tube after said tube starts, the decreased portion of the voltage across said tube being sufficient to maintain conduction of said tube, and a second series circuit comprising a discharge tube and ballast means, said second series circuit being connected across the secondary of said transformer, the increased portion of the voltage across said primary causing an increased voltage across said secondary which is sufficient to start said second tube.

2. Apparatus according to claim 1 wherein said source is a square wave generator.

3. Apparatus according to claim 1 wherein said discharge tubes are fluorescent lamps.

4. Apparatus according to claim 1 wherein said ballast means is an inductor and wherein a capacitor is connected across said second series circiut for power factor correction.

5. In a fluorescent lighting system, a square wave generator in the form of a transistorized inverter circuit having a transformer output, a first fluorescent lamp having first and second heater elements connected to secondary windings on said transformer output, a second fluorescent lamp having a third heater element connected to said second heater element and having a fourth heater element connected to a secondary winding on said transformer output, a high voltage secondary winding on said transformer output having one terminal connected to said first heater element and the other terminal connected through a primary winding of a first transformer to said second heater element, a secondary winding on said first transformer being connected between said second and fourth heater elements through a ballast device.

6. Apparatus according to claim 5 wherein said ballast device comprises a transformer having a fluorescent lamp in the secondary circuit thereof.

References Cited in the file of this patent
UNITED STATES PATENTS

| | | |
|---|---|---|
| 2,123,459 | Andersen | July 12, 1938 |
| 2,162,597 | Zecher | June 13, 1939 |
| 2,949,565 | Rohloff et al. | Aug. 16, 1960 |